(12) United States Patent
Yuk et al.

(10) Patent No.: US 11,979,213 B2
(45) Date of Patent: May 7, 2024

(54) METHODS AND APPARATUSES FOR CHANNEL STATE INFORMATION CONFIGURATION AND REPORTING FOR MULTI-TRANSMISSION RECEPTION POINT OPERATION

(71) Applicant: Nokia Technologies Oy, Espoo (FI)

(72) Inventors: Youngsoo Yuk, Seoul (KR); Keeth Saliya Jayasinghe Laddu, Espoo (FI); Nitin Mangalvedhe, Hoffman Estates, IL (US)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/753,959

(22) PCT Filed: Sep. 23, 2020

(86) PCT No.: PCT/IB2020/058896
§ 371 (c)(1),
(2) Date: Mar. 18, 2022

(87) PCT Pub. No.: WO2021/059162
PCT Pub. Date: Apr. 1, 2021

(65) Prior Publication Data
US 2022/0337300 A1    Oct. 20, 2022

Related U.S. Application Data

(60) Provisional application No. 62/904,814, filed on Sep. 24, 2019.

(51) Int. Cl.
*H04B 7/06*    (2006.01)
*H04B 7/0456*    (2017.01)
(Continued)

(52) U.S. Cl.
CPC ......... *H04B 7/0626* (2013.01); *H04B 7/0486* (2013.01); *H04L 5/0035* (2013.01); *H04L 5/0092* (2013.01); *H04W 72/54* (2023.01)

(58) Field of Classification Search
CPC ... H04B 7/0626; H04B 7/0486; H04W 72/54; H04L 5/0035; H04L 5/0092
See application file for complete search history.

(56) References Cited

U.S. PATENT DOCUMENTS

| 9,763,129 B2* | 9/2017 | Xia .................... H04B 7/0626 |
| 2020/0169374 A1* | 5/2020 | Qi ........................ H04L 5/0035 |

(Continued)

FOREIGN PATENT DOCUMENTS

| WO | 2018/203604 A1 | 11/2018 |
| WO | 2018/229078 A1 | 12/2018 |

(Continued)

OTHER PUBLICATIONS

"Revised WID: Enhancements on MIMO for NR", 3GPP TSG RAN Meeting #81, RP-182067, Agenda Item: 9.4.1, Samsung, Sep. 10-13, 2018, 5 Pages.

(Continued)

*Primary Examiner* — Jaison Joseph
(74) *Attorney, Agent, or Firm* — Lippes Mathias LLP

(57) ABSTRACT

Systems, methods, apparatuses, and computer program products for channel state information (CSI) configuration and reporting for multi-transmission reception point (TRP) operation are provided. One method may include configuring a user equipment (UE), by a network node, to provide independent channel state information (CSI) feedback per transmission reception point (TRP) and to indicate additional information. The configuring of the UE may include (Continued)

configuring the UE with at least one of several reporting options for generating a combined channel state information (CSI) report.

14 Claims, 5 Drawing Sheets

(51) Int. Cl.
*H04L 5/00* (2006.01)
*H04W 72/54* (2023.01)

(56) References Cited

U.S. PATENT DOCUMENTS

| | | | |
|---|---|---|---|
| 2020/0314818 A1* | 10/2020 | Jin | H04W 72/23 |
| 2021/0143870 A1* | 5/2021 | Faxér | H04B 7/0626 |
| 2022/0124751 A1* | 4/2022 | Matsumura | H04B 7/024 |
| 2022/0337300 A1* | 10/2022 | Yuk | H04L 5/0092 |
| 2022/0338222 A1* | 10/2022 | Kim | H04L 5/00 |

FOREIGN PATENT DOCUMENTS

| | | |
|---|---|---|
| WO | 2019/029461 A1 | 2/2019 |
| WO | 2019/093764 A1 | 5/2019 |
| WO | 2020/089863 A1 | 5/2020 |
| WO | 2020/144602 A1 | 7/2020 |

OTHER PUBLICATIONS

"3rd Generation Partnership Project; Technical Specification Group Radio Access Network; NR; Radio Resource Control (RRC) protocol specification (Release 15)", 3GPP TS 38.331, V15.6.0, Jun. 2019, pp. 1-519.
"3rd Generation Partnership Project; Technical Specification Group Radio Access Network; NR; Medium Access Control (MAC) protocol specification (Release 15)", 3GPP TS 38.321, V15.6.0, Jun. 2019, pp. 1-78.
"3rd Generation Partnership Project; Technical Specification Group Radio Access Network; NR; Multiplexing and channel coding (Release 15)", 3GPP TS 38.212, V15.6.0, Jun. 2019, pp. 1-101.
"3rd Generation Partnership Project; Technical Specification Group Radio Access Network; NR; Physical layer procedures for data (Release 15)", 3GPP TS 38.214, V15.6.0, Jun. 2019, pp. 1-105.
Invitation To Pay Additional Fees received for corresponding Patent Cooperation Treaty Application No. PCT/IB2020/058896, dated Dec. 8, 2020, 12 Pages.
"Views on CSI framework for multi-TRP", 3GPP TSG RAN WG1 Meeting #97, R1-1907424, Agenda Item: 7.2.8.5, Ericsson, May 13-17, 2019, 2 Pages.
"Considerations on DL multi-panel and multi-TRP transmission", 3GPP TSG RAN WG1 Meeting NR#3, R1-1715798, Agenda Item: 6.2.1.6, CATT, Sep. 8-21, 2017, 4 Pages.
International Search Report and Written Opinion received for corresponding Patent Cooperation Treaty Application No. PCT/IB2020/058896, dated Mar. 15, 2021, 21 Pages.
"UE Power Saving in MIMO operation", 3GPP TSG RAN WG1 NR #95, R1-1813358, Agenda item: 7.2.9.2.1, Motorola Mobility, Nov. 12-16, 2018, pp. 1-3.

* cited by examiner

| R | BWP ID | | |
|---|---|---|---|
| | Serving Cell ID | | |
| | $T_0$ | $T_1$ | $T_2$ | $T_3$ | $T_4$ | $T_5$ | $T_6$ | $T_7$ |
| | $T_8$ | $T_9$ | $T_{10}$ | $T_{11}$ | $T_{12}$ | $T_{13}$ | $T_{14}$ | $T_{15}$ |

Oct 1, Oct 2, Oct 3, ... Oct N

Oct N: $T_{(N-2) \times 8}$, $T_{(N-2) \times 8+1}$, $T_{(N-2) \times 8+2}$, $T_{(N-2) \times 8+3}$, $T_{(N-2) \times 8+4}$, $T_{(N-2) \times 8+5}$, $T_{(N-2) \times 8+6}$, $T_{(N-2) \times 8+7}$

FIG. 1

METHODS AND APPARATUSES FOR CHANNEL STATE INFORMATION CONFIGURATION AND REPORTING FOR MULTI-TRANSMISSION RECEPTION POINT OPERATION

RELATED APPLICATION

This application claims priority to PCT Application No. PCT/IB2020/058896, filed on Sep. 23, 2020, which claims priority to US Provisional Application No. 62/904,814, filed on Sep. 24, 2019, each of which is incorporated herein by reference in its entirety.

CROSS-REFERENCE TO RELATED APPLICATIONS

This application claims priority from U.S. provisional patent application No. 62/904,814 filed on Sep. 24, 2019. The contents of this earlier filed application are hereby incorporated by reference in their entirety.

FIELD

Some example embodiments may generally relate to mobile or wireless telecommunication systems, such as Long Tenn Evolution (LTE) or fifth generation (5G) radio access technology or new radio (NR) access technology, or other communications systems. For example, certain embodiments may relate to systems and/or methods for channel state information (CSI) configuration and reporting for multi-transmission reception point (TRP) operation.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. 5G wireless systems refer to the next generation (NG) of radio systems and network architecture. 5G is mostly built on a new radio (NR), but a 5G (or NG) network can also build on E-UTRA radio. It is estimated that NR provides bitrates on the order of 10-20 Gbit/s or higher, and can support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) may be named gNB when built on NR radio and may be named NG-eNB when built on E-UTRA radio.

SUMMARY

An embodiment may be directed to a method that includes signaling or indicating, by a network node, to one or more UEs a set of combinations of TCI states in a MAC-CE. The method may then include selecting one of the combinations of TCI states signaled in the MAC-CE for PDSCH transmission, for example, by DCI signaling.

In a variant, the signaled combinations of TCI states may be a subset of all TCI states configured by RRC.

According a variant, the signaling may include signaling the MAC-CE having an enhanced MAC-CE format that supports the maximum number of TCI states that need to be activated. For example, in a variant, the MAC-CE may include additional octets for indicating the combination of TCI states for each codepoint.

In a variant, the additional octets may include at least one of: NrofCodepoints, NoRpt, and/or NoTRS, where the NrofCodepoints represents the number of codepoints and may be used to determine the activated TCI states, NoRpt indicates if CSI report is required for deactivated TCI states, and NoTRS indicates if TRS associated with deactivated TCI states are transmitted.

In a variant, the MAC-CE may also include one or more codepoints mapping that may provide the mapping information of TCI states to TCI codepoints.

In a variant, the codepoint mapping may be implemented as a M×P bitmap to map M TCI states to P TCI codepoints, where M represents the TCI states that are activated from the first part of the MAC-CE and P represents the TCI codepoints that are signaled with NrofCodepoints in the MAC-CE.

In another variant, the codepoint mapping may be implemented such that, for each of P TCI codepoints, 2 TCI state indices are included in order.

In another variant, the codepoint mapping may be implemented such that a different size of bitmap is used according to the number of the activated TCI states, where the bitmap size can be calculated as $$\binom{M+L-1}{L}\text{bits,}$$

where L is the maximum number of TCI states to be included in a TCI codepoint.

An embodiment may be directed to a method that includes configuring a UE, by a network node, to provide independent CSI feedback per TRP and to indicate additional information. The configuring may include configuring the UE with at least one of several reporting options for generating a combined CSI report.

In a variant, the additional information may include a preferred combination of the cooperating TRPs/TCI states (including single TRP operation) and the combined CQI, RI combinations, etc. In a variant, the configuring may include configuring the UE to indicate a predetermined number of preferred combinations of cooperating TRPs/TCI states and the combined CQI, etc., for each preferred combination to enable the network node to make a final, efficient scheduling decision.

In a variant, the configuring may include configuring the UE with a first reporting option, where one combined CSI report may include at least one of: the two best CRI (TCI states), rank combination 3 bits (1, 2, 3, 4, 1+1, 2+1, 1+2, 2+2) mapped in order of TCI states, one combined CQI, and/or PMI.

In another variant, the configuring may include configuring the UE with a second reporting option, where the CSI report may include one CSI for single-TRP and additional parameters which may include delta or difference-value parameter(s). According to the second reporting option, the CSI for single-TRP operation (corresponding to the best TRP or the primary TRP) may include $CRI_1$, $RI_1=\{1,2,3,4\}$, $CQI_1$ (assuming single TRP is used), and/or $PMI_1$ (when assuming the single TRP transmission). In a variant, the delta parameters for multi-TRP may include at least one of: $CRI_2$, delta RSRP, RI delta in which $RI=RI_1+RI$ delta, CQI delta in which $CQI=CQI_1-CQI$ delta when multi-TRP is used, and/or $PMI_2$ that is PMI for the second TRP or one combined PMI.

In a variant, the configuring may include configuring the UE with a third reporting option, where the CSI report may be dynamically selected between the first reporting option and the second reporting option, for example, according to the TCI codepoints indicated. For instance, according to a variant, if at least one codepoint includes single TCI state, then option 2 may be dynamically selected. According to a variant, if none of the codepoints include single TCI state, then option 1 may be dynamically selected.

According to a further variant, the method may also include receiving, from the UE, a CSI report generated by the UE according to one or more of the configured reporting options.

An embodiment may be directed to a method that includes receiving, by a UE, a MAC-CE to activate a set of TCI states. The method may also include waiting a certain time offset from the completion of the MAC-CE reception to use the indicated TCI states.

According to a variant, for a CSI report configuration for CSI acquisition, the method may include triggering the CSI report configuration associated to the activated TCI states. In a variant, when a CSI report configuration is associated only with non-activated TCI states, the method may include skipping the CSI feedback and optionally also skipping CSI measurement.

In a variant, for a CSI report configuration which is configured for L1-RSRP reporting, the method may include performing the CSI measurement and the CSI reporting.

In a variant, the method may include skipping TRS reception when TCI states are deactivated. In some variants, to trigger the skipping of CSI feedback or TRS reception, the method may include receiving explicit signaling from the network indicating to skip CSI measurement and/or reporting. For instance, in a variant, the method may include receiving, from the network (e.g., gNB), an explicit indication to skip CSI measurement and/or feedback, and/or an explicit indication to stop TRS when it is deactivated. In a variant, the method may include stopping the reception of the TRS not activated. In a variant, the method may include suspending transmission of TRS when the corresponding TCI state is deactivated.

In some variants, the receiving of the indication(s) to skip CSI measurement/feedback and/or to stop reception of the TRS not activated may include receiving the indication(s) via MAC-CE. For example, in some variants, the indication(s) may be received through the MAC-CE that is to be used for TCI activation, or may be received in a new MAC-CE that can be used to indicate the absence of TRS. According to a variant, the indication can be received per TCI state or 1 bit field can indicate an absence of all non-activated TCI states.

An embodiment may be directed to a method that includes receiving, by a UE, a configuration, from the network, to provide independent CSI feedback per TRP and to indicate additional information. The receiving of the configuration may include receiving a configuration for at least one of several reporting options for generating a combined CSI report.

In a variant, the additional information may include a preferred combination of the cooperating TRPs/TCI states (including single TRP operation) and the combined CQI, RI combinations, etc. In a variant, the receiving may include receiving a configuration for the UE to indicate a predetermined number of preferred combinations of cooperating TRPs/TCI states and the combined CQI, etc., for each preferred combination to enable the network node to make a final, efficient scheduling decision.

In a variant, the receiving may include receiving a configuration for a first reporting option, where one combined CSI report may include at least one of: the two best CRI (TCI states), rank combination 3 bits (1, 2, 3, 4, 1+1, 2+1, 1+2, 2+2) mapped in order of TCI states, one combined CQI, and/or PMI.

In another variant, the receiving may include receiving a configuration for a second reporting option, where the CSI report may include one CSI for single-TRP and additional parameters which may include delta or difference-value parameter(s). According to the second reporting option, the CSI for single-TRP operation may include $CRI_1$, $RI_1=\{1,2,3,4\}$, $CQI_1$, and/or $PMI_1$. In a variant, the delta parameters for multi-TRP may include at least one of: $CRI_2$, delta RSRP, RI delta in which $RI=RI_1+RI$ delta, CQI delta in which $CQI=CQI_1-CQI$ delta when multi-TRP is used, and/or $PMI_2$ that is PMI for the second TRP or one combined PMI.

In a variant, the receiving may include receiving a configuration for a third reporting option, where the CSI report may be dynamically selected between the first reporting option and the second reporting option, for example, according to the TCI codepoints indicated. For instance, according to a variant, if at least one codepoint includes single TCI state, then the method may include dynamically selecting option 2 for CSI reporting. According to a variant, if none of the codepoints include single TCI state, then the method may include dynamically selecting option 1 for CSI reporting.

In a variant, the method may include generating a CSI report according to one or more of the received configuration options discussed above. In a variant, the method may then include transmitting the generated CSI report to the network.

BRIEF DESCRIPTION OF THE DRAWINGS

For proper understanding of example embodiments, reference should be made to the accompanying drawings, wherein:

FIG. 1 illustrates an example medium access control (MAC)-control element (CE) with transmission configuration indicator (TCI) states activation/deactivation for UE-specific physical downlink shared channel (PDSCH);

DETAILED DESCRIPTION

Figure 2:
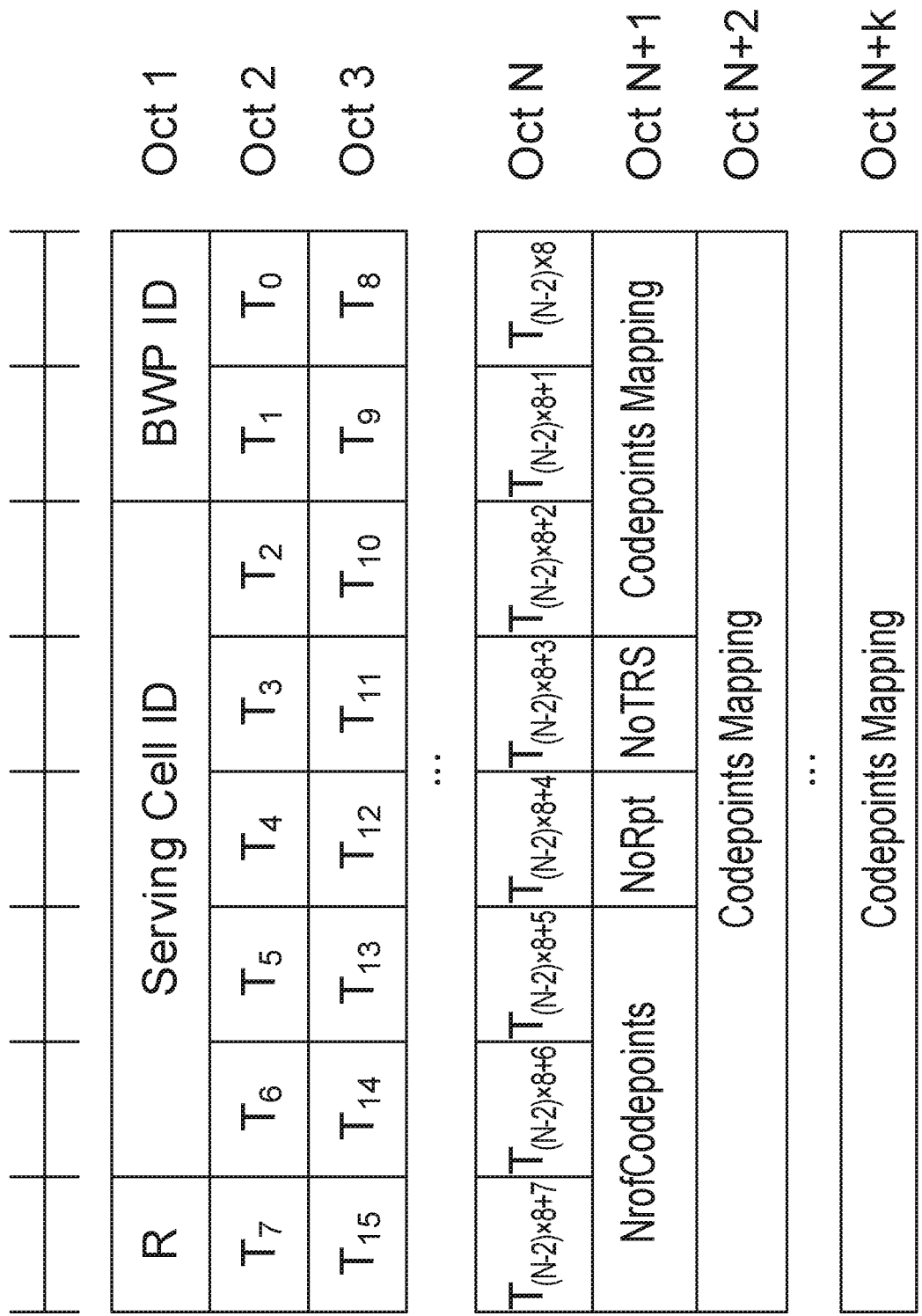
FIG. 2 illustrates an example MAC-CE with TCI states activation/deactivation for UE-specific PDSCH when multiple-TRP operation is configured, according to one embodiment.

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for channel state information (CSI) configuration and reporting for multi-transmission reception point (TRP) operation, is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "some embodiments," or other similar language, throughout this specification refers to the fact that a particular feature, structure, or characteristic described in connection with an embodiment may be included in at least one embodiment. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or procedures discussed below may be performed in a different order and/or concurrently with each other. Furthermore, if desired, one or more of the described functions or procedures may be optional or may be combined. As such, the following description should be considered as merely illustrative of the principles and teachings of certain example embodiments, and not in limitation thereof.

Certain embodiments relate to the multi-TRP/panel transmissions, which is part of ongoing 3GPP Release-16 work items for enhancements on multiple-input multiple-output (MIMO). Multi-TRP/panel transmission is considered an important component in NR deployments due to the benefits of eMBB operations, as well as the capability of improving reliability for the URLLC services.

Enhancements on multi-TRP/panel transmission include improved reliability and robustness with both ideal and non-ideal backhaul. Downlink control signalling enhancement(s) will be specified for efficient support of non-coherent joint transmission. Furthermore, if needed, enhancements on uplink control signalling and/or reference signal(s) for non-coherent joint transmission may be specified. Multi-TRP techniques for URLLC requirements may also be included.

Two techniques have been agreed upon for supporting multi-TRP transmission in NR. Specifically, these techniques include single physical downlink control channel (PDCCH) design and multiple PDCCH design. Single PDCCH schedules one physical downlink shared channel (PDSCH) where separate layers are transmitted from separate TRPs; whereas multiple PDCCHs each schedule a respective PDSCH where each NR-PDSCH is transmitted from a separate TRP. In the single PDCCH design, a PDCCH from one TRP schedules PDSCH from one or two TRPs, and coordinated scheduling is performed. Therefore, this technique is suitable for cases of ideal backhaul.

A transmission configuration indicator (TCI) code point in downlink control information (DCI) can indicate one or two TCI states, and for related demodulation reference signal (DM-RS) port mapping each TCI state corresponds to one DM-RS code division multiplex (CDM) group.

It has been agreed that TCI indication framework will be enhanced in Release-16 at least for eMBB. Each TCI code point in a DCI can correspond to 1 or 2 TCI states. When 2 TCI states are activated within a TCI code point, each TCI state corresponds to one CDM group, at least for DMRS type 1. The design for DMRS type 2 has yet to be determined. Similarly, TCI field in DCI and the associated MAC-CE signaling impact has yet to be determined.

Further, it has been agreed that, for TCI state configuration in order to enable one or two TCI states per a TCI code point, MAC-CE enhancement to map one or two TCI states for a TCI code point where further detailed design is to be determined. It will also be determined whether to increase the number of bits of TCI field in DCI.

However, 3GPP Release-15 design cannot support multiple TCI states, and the introduction of multiple TCI states may have impact on the signalling method.

In 3GPP NR Release-15, if higher layer parameter tci-PresentInDCI is enabled, 3 bit TCI field in DCI is used to indicate the TCI codepoint indicating which TCI state is used for PDSCH transmission. One of up to 8 TCI states can be dynamically signaled by DCI, and the 8 candidate TCI states are signaled by medium access control (MAC) control element (CE) signalling. A gNB selects up to 8 TCI states among all TCI states (max 128 TCI states) configured for a UE, and sends this list to a UE by MAC CE signalling.

For multi-TRP/panel transmission, a UE can receive PDSCH from one or two TRPs, and the UE should be able to be signalled for the combination of the transmitting TRPs. In Release-15, however, only one TCI state can be signalled. So, in order to allow multiple TCI states where each TCI state corresponds to a TRP or a panel, it has been agreed that a TCI codepoint for multi-TRP operation can indicate one or two TCI states.

However, several issues arise in defining the above-discussed new operations. First, there is currently no clear method to indicate the combination of TCI states via MAC-CE. Since the existing MAC-CE only indicates the activated TCI states, there is a need for a new signalling method to be defined.

Secondly, increased UE complexity is introduced due to the increase in the number of CSI resources to be monitored. To support multiple TRP transmission with two TCI states, a UE should monitor all the reference signals relevant with the candidate TCI states. In Release-15, TCI state of PDSCH can be configured as quasi colocation (QCL)-TypeA with a tracking reference signal (TRS) or a CSI-RS for acquisition. Thus, at least a UE should monitor the number of TRSs and/or CSI-RSs for acquisition for each TRP. A gNB can configure multiple CSI-RS resource sets for TRS, CSI-RS for acquisition and/or CSI-RS for layer 1 reference signal received power (L1 -RSRP) measurement. If the number of TRPs is large, monitoring all of the candidate TRPs would not be efficient, as it would greatly increase the UE's overhead. Thus, there is a need to optimize a UE's monitoring for CSI resource at least to provide the UE with power savings and to avoid the waste of downlink resources.

Thirdly, an issue arises related to UE procedure for CSI reporting. In 3GPP Release-15, the CSI report is designed for single TRP operation. For single PDCCH based multi- TRP operation, a new CSI reporting method should be supported. In Release-15, a UE can be configured with one or more CSI report configurations and one or more CSI resource configurations. Each CSI report configuration is associated with a CSI resource configuration for channel measurement, and the CSI resource setting contains a configuration of a list of one or more CSI resource sets. However, if the resource type is periodic or semi-persistent, only one CSI-resource set can be configured for a UE. For multi-TRP operation, a UE should be capable of reporting CSI per TRP. Among multiple TCI states associated with a TRP, at least CSI feedback for one of the TCI states should be reported. However, in 3GPP Release-15, the number of CSI reports for one CSI resource is limited to one even though a UE can be configured with multiple CSI resources having different TCI states (QCL info).

A UE can be activated or deactivated a set of TCI states via MAC-CE. FIG. 1 illustrates an example of the MAC-CE format that can be used. As illustrated in FIG. 1, serving cell ID is the field that indicates the identity of the serving cell for which the MAC CE applies. The length of this field may be 5 bits. As further illustrated in FIG. 1, the bandwidth part (BWP) ID is the field that indicates a downlink (DL) BWP for which the MAC CE applies as the codepoint of the DCI BWP indicator field (e.g., as specified in 3GPP TS 38.212). The length of the BWP ID field may be 2 bits.

As also illustrated in FIG. 1, the $T_i$ field indicates the activation or deactivation status of the TCI state with TCI-StateId i, if there is a TCI state with TCI-StateId i (e.g., as specified in TS 38.331). Otherwise, the MAC entity may ignore the $T_i$ field. The $T_i$ field may be set to 1 to indicate that the TCI state with TCI-StateId i should be activated and mapped to a codepoint of the DCI Transmission Configuration Indication field (e.g., as specified in 3GPP TS 38.214). The $T_i$ field may be set to 0 to indicate that the TCI state with TCI-StateId i should be deactivated and is not mapped to a codepoint of the DCI Transmission Configuration Indication field. The codepoint to which the TCI State is mapped may be determined by its ordinal position among all the TCI States with $T_i$ field set to 1, i.e., the first TCI State with $T_i$ field set to 1 shall be mapped to the codepoint value 0, second TCI State with $T_i$ field set to 1 shall be mapped to the codepoint value 1, and so on. The maximum number of activated TCI states may be 8. In addition, the R filed is a reserved bit, which may be set to 0.

The existing DCI format 1_1 cannot support multiple TCI states, and the parameters are used for single TRP. For example, DCI Format 1_1 may include a transmission configuration indication and rate matching indicator field, which may be impacted when two TCI states are indicated. The transmission configuration indication field may be 0 bit if higher layer parameter tci-PresentInDCI is not enabled; otherwise it may be 3 bits (e.g., as defined in 3GPP TS 38.214, subclause 5.1.5).

In 3GPP Release-15, for each CSI-report configuration, one CSI report quantity can be configured, and they can be a combination of, for example, CSI-RS resource indicator (CRI), rank indicator (RI), precoding matric indicator (PMI) and channel quality indicator (CQI). For single PDCCH based multi-TRP operation, the CSI report can be for primary TRP and/or secondary TRP. CSI for primary TRP may include RI, CQI, PMI; secondary TRP may include RI, PMI, CQI (if two code words are supported). It is noted that primary TRP may be a TRP transmitting PDCCH to the UE for single-PDCCH based multi-TRP operation, or primary TRP may be a TRP transmitting RRC signals to the UE for single/multi-PDCCH based multi-TRP operation.

Currently, according to existing specification (e.g., 3GPP TS 38.214 V15.6.0), a UE can be configured with one periodic or semi-persistent CSI-RS resource set and associated CSI-report configuration, and/or one or more aperiodic CSI-RS resource sets and their associated CSI-report configuration. Time domain behavior of CSI reporting is limited by CSI-RS configuration used and Table 1 below shows the possible reporting options for each CSI-RS configuration. Aperiodic CSI-RS can be configured with aperiodic CSI reporting only, and the uplink control information (UCI) can be sent via physical uplink shared channel (PUSCH) when CSI request field in DCI format 0_1 is used. This reporting cannot be sent via physical uplink control channel (PUCCH).

TABLE 1

| CSI-RS Configuration | Periodic CSI Reporting | Semi-Persistent CSI Reporting | Aperiodic CSI Reporting |
| --- | --- | --- | --- |
| Periodic CSI-RS | No dynamic triggering/activation | For reporting on PUCCH, the UE receives an activation command; for reporting on PUSCH, the UE receives triggering on DCI | Triggered by DCI; additionally, subselection indication possible |
| Semi-Persistent CSI-RS | Not Supported | For reporting on PUCCH, the UE receives an activation command; for reporting on PUSCH, the UE receives triggering on DCI | Triggered by DCI; additionally, subselection indication possible |
| Aperiodic CSI-RS | Not Supported | Not Supported | Triggered by DCI; additionally, subselection indication possible |

Example embodiments provide solutions for at least the aforementioned problems in existing solutions. For example, certain embodiments provide methods that support multi-TRP transmissions, reduce UE's overhead due to unnecessary measurements or feedback, and efficiently configure UE's CSI report and CSI resources for non-coherent joint transmission (NC-JT) scheme.

In an embodiment, one or more UEs may be signaled with a set of combinations of TCI states via MAC-CE. The signaled combinations of TCI states may be a subset of all TCI states configured by RRC. And, one of the combinations of TCI states may be selected for PDSCH transmission by DCI signaling.

According to one embodiment, in order to indicate the combinations of TCI states, a new enhanced MAC-CE format and signaling may be provided. FIG. 2 illustrates an example of an enhanced MAC-CE when multi-TRP operation is configured, according to certain embodiments. As illustrated in the example of FIG. 2, the MAC-CE format is extended to support the maximum number of TCI states that need to be activated. Additionally, some embodiments support further improvement in the signaling of activated TCI states, other than fixed bitmap.

As depicted in the example of FIG. 2, to indicate the combination of TCI states for each codepoint, the MAC-CE may include additional octets (e.g., Oct N+1, Oct N+2, ... Oct N+k), in which the number of codepoints (NrofCodepoints), NoRpt and NoTRS are included. NrofCodepoints may be used to determine the activated TCI states and number of code points, NoRpt may be used to indicate if CSI report is required for deactivated TCI states, and NoTRS may be used to indicate if TRS associated with deactivated TCI states are transmitted. It is noted that, in certain embodiments, the inclusion of NrofCodepoints, NoRpt and/or NoTRS may be optional. For example, in some embodiments, the MAC-CE may not need to include the NrofCodepoints.

In the following, it may be assumed that M TCI states are activated from the first part of the MAC-CE, and P TCI code points are signalled with NrofCodepoints in the MAC-CE. As depicted in FIG. 2, the codepoints mapping may provide the mapping information of TCI states to TCI codepoints. Example embodiments provide several options for implementing the codepoints mapping.

In one embodiment, the codepoint mapping may be implemented as a M×P bitmap to map M TCI states to P TCI codepoints. The first P bits may be used for mapping the first TCI state to P TCI codepoints (if bit sets to one, the TCI state is included for the corresponding TCI codepoint). Each codepoint (column) may have one or more bits set to one, and if only one bit sets to one, the codepoint may be considered as indicating single-TRP transmission. As one non-limiting example, if, e.g., M=3 and P=4 with maximum activated TCI states per codepoint is 2, the M×P bitmap may be represented by the following:

1 0 1 0
1 1 0 1
0 1 1 0, in which Codepoint 0: ($TCI_1+TCI_2$), Codepoint 1: ($TCI_2+TCI_3$), Codepoint2: ($TCI_1+TCI_3$), Codepoint 3: ($TCI_2$), where $TCI_i$ is the i-th activated TCI state, i=1, . . . , M.

In another embodiment, the codepoint mapping may be implemented such that, for each of P TCI codepoints, 2 TCI state indices are included in order, resulting in an M×P bitmap. If the two TCI states are the same for a codepoint, in this embodiment, it would mean single TCI state is mapped to the TCI codepoint and single-TRP transmission is used. For example, if M<=4, then 4 bits (2+2 bits) for each TCI codepoint may be included. As another example, if 4<M≤8, then 6 bits (3+3 bits) for each TCI codepoint may be included. In another example, if 8<M≤16, then 8 bits (4+4 bits) for each TCI codepoint may be included.

In another embodiment, the codepoint mapping may be implemented such that a different size of bitmap is used according to the number of the activated TCI states. Table 2 below shows an example of the activated TCI states. The bitmap size (also reflecting the number of codepoints) is shown in the last row of Table 2, and, in certain embodiments, the bitmap size can be calculated as $$\binom{M+L-1}{L} \text{bits},$$

where L is the maximum number of TCI states to be included in a TCI codepoint. As one example, if M=4 and L=2, then the bit map size may be $$\binom{4+2-1}{2} = 10 \text{ bits}.$$

Table 1 below shows the example of the indexing when L=2. However, this is just one example and embodiments are not limited to this example.

The entries in Table 2 are the indices within the bitmap corresponding to different combinations of activated TCI states that can be mapped to codepoints. If a bit in the bitmap is set to 1, it indicates that the combination of the $1^{st}$ and $2^{nd}$ activated TCI states corresponding to that index in the table is mapped to a codepoint. The position of that bit among all the bits that are set to 1 indicates the codepoint index. Thus, the maximum number of bits in the bitmap that may be set to 1 is $2^P$. For example, if 4 TCI states are activated, a 10-bit bitmap may be used to signal the combination of the corresponding codepoint. As another example, if 6 TCI states are activated, then 21-bit bitmap may be used.

For example, if 4 TCI states are activated, the codepoints for TCI combinations may be: ($TCI_1$)=0, ($TCI_3$)=3, ($TCI_1+TCI_2$)=2, ($TCI_1+TCI_3$)=5, ($TCI_2+TCI_4$)=8, with a bitmap=1 0 1 1 0 1 0 0 1 0, where the number of codepoints is 5 such that, Codepoint 0 → ($TCI_1$), Codepoint 1 → ($TCI_1+TCI_2$), Codepoint 2 → ($TCI_3$), Codepoint 3 → ($TCI_1+TCI_3$), Codepoint 4 → ($TCI_2+TCI_4$).

TABLE 2

| The First TCI state among activated TCI states to be included in the TCI codepoints | The second TCI state among activated TCI states to be included in the TCI codepoints | | | | | | | |
|---|---|---|---|---|---|---|---|---|
| | $1^{st}$ activated TCI state | $2^{nd}$ activated TCI state | $3^{rd}$ activated TCI state | $4^{th}$ activated TCI state | $5^{th}$ activated TCI state | $6^{th}$ activated TCI state | $7^{th}$ activated TCI state | $8^{th}$ activated TCI state |
| 1st activated TCI state | 0 | 2 | 5 | 9 | 14 | 20 | 27 | 35 |
| $2^{nd}$ activated TCI state | | 1 | 4 | 8 | 13 | 19 | 26 | 34 |
| $3^{rd}$ activated TCI state | | | 3 | 7 | 12 | 18 | 25 | 33 |
| $4^{th}$ activated TCI state | | | | 6 | 11 | 17 | 24 | 32 |
| $5^{th}$ activated TCI state | | | | | 10 | 16 | 23 | 31 |
| $6^{th}$ activated TCI state | | | | | | 15 | 22 | 30 |
| $7^{th}$ activated TCI state | | | | | | | 21 | 29 |
| $8^{th}$ activated TCI state | | | | | | | | 28 |
| # of bits for bitmap | 1 | 3 | 6 | 10 | 15 | 21 | 28 | 36 |

It is noted that, in example embodiments where the size of the bitmap is determined according to the number of activated TCI states, the NrofCodepoints does not need to be included in the MAC-CE. Instead, the UE can derive the number of codepoints with the number of bits set to 1 in the bitmap (the number of codepoints is the largest value of P for which $2^P$ does not exceed the number of bits set to 1), and 3 or 4 more bits can be reduced. Further, according to the example embodiments where the size of the bitmap is determined according to the number of activated TCI states, a significant reduction in overhead can be achieved in comparison to the other options.

Further embodiments provide a method to reduce a UE's overhead from unnecessary measurement and/or feedback. In an embodiment, a UE may receive MAC-CE to activate a set of TCI states, and then the UE may be configured to wait a "time offset" from the completion of MAC-CE reception to use the indicated new TCI states. In one example, the "time offset" may refer to a waiting time in slots and/or symbols, from the reception of the MAC-CE to the use of the new indicated TCI states. According to one example embodiment, the "time offset" may be for instance 3ms or 3 subframes. According to one embodiment, for a CSI report configuration for CSI acquisition, the UE may be configured to trigger the CSI report configuration associated to the activated TCI states. If a CSI report configuration is associated only with non-activated TCI states, the UE may be configured to skip the CSI feedback or even CSI measurement.

In an embodiment, for a CSI report configuration which is configured for L1-RSRP reporting, the UE may be configured to perform the measurement and the report. Then, based on reported L1-RSRP report, the network (e.g., gNB) can update the candidate TCI states without receiving other CSI feedback. Hence, in this example embodiment, CSI feedback of deactivated TCI states may be omitted because the update of TCI states can be performed by another CSI feedback (e.g., L1-RSRP report) procedures.

According to certain embodiments, the UE may be configured to skip TRS reception when TCI states are deactivated. For the above skipping of CSI feedback or TRS reception, instead of an implicit method, explicit signaling can be used. For instance, the network (e.g., gNB) may explicitly inform the UE to skip CSI measurement and feedback, and/or explicitly inform the UE of gNB's stopping TRS transmission when it is associated with deactivated TCI states. In this case, the UE may stop the reception of the TRS not activated. Because a CSI-RS resource set for CSI acquisition can include multiple TCI states, stopping transmission of only part of CSI-RS resources may not be efficient. For TRS, all the CSI-RS resources in a CSI-RS resource set have the same QCL parameter (TCI state); thus, in an embodiment, the transmission of TRS can be suspended when the corresponding TCI state is deactivated.

In some embodiments, the indication that informs the UE to skip CSI measurement/feedback and/or to stop reception of the TRS not activated can be signaled to the UE via MAC-CE. For example, the above information can be signaled through the MAC-CE that is to be used for TCI activation, or a new MAC-CE can be used to indicate the absence of TRS. According to certain embodiments, the indication can be signaled per TCI state or 1 bit field can indicate an absence of all non-activated TCI states.

Further embodiments provide a method for efficiently configuring a UE's CSI report and CSI resources for NC-JT scheme, for example. One aspect relates to an approach for generating CSI feedback. For instance, in an embodiment, a UE may be configured to provide independent CSI feedback per TRP and also to indicate additional information, such as the preferred combination of the cooperating TRPs/TCI states (including single TRP operation) and the combined CQI, RI combinations, etc. In an extension of this, the UE can be configured to indicate a number of preferred combinations (that may be configured by the network) of cooperating TRPs/TCI states and the combined CQI, etc. for each preferred combination to enable the network (e.g., gNB) to make a final scheduling decision.

According to certain embodiments, in order to generate a combined CSI report, a UE can be configured with one of several reporting options, as discussed below. For these cases, it may be assumed that, rank combinations are limited to a predetermined set, e.g., 1, 2, 3, 4, 1+1, 2+1, 1+2, 2+2, where 2+1 indicates RI=2 for the first TRP and RI=1 for the second TRP.

According to a first option (option 1), one combined CSI report may include: two best CRI (e.g., the most suitable TCI states for multi-TRP transmission), rank combination 3 bits (1, 2, 3, 4, 1+1, 2+1, 1+2, 2+2) mapped in order of TCI states, one combined CQI, and PMI. According to one example, the two best CRI may be determined or selected, for instance, by the UE based on RSRP measurements of configured CSI-RS resources, higher rank/throughput, and/or low interference, etc. In this example, PMI can be either one of two separate PMIs or one combined PMI (e.g., similar to multi-panel type I codebook in 3GPP TS 38.214).

According to a second option (option 2), the CSI report may include one CSI for single-TRP and additional parameters including delta or difference-value parameter(s). Under this option, the CSI for single-TRP operation (correspond to the best TRP or the primary TRP) may include $CRI_1$, $RI_1=\{1,2,3,4\}$, $CQI_1$ (assuming single TRP is used), and/or $PMI_1$ (when assuming the single TRP transmission). The delta parameters for multi-TRP may include $CRI_2$, delta RSRP (i.e., RSRP deference between two CSI-RS resources, which can be skipped if additional beam management is already providing the difference of RSRP of two TRPs), RI delta (2 bit)=0, 1 or 2 (if RI delta=0, single TRP operation, and no further information is included) in which RI=$RI_1$+RI delta (e.g., if $RI_1$=2, RI delta=1 ➔ RI=2+1 or if $RI_1$=3, RI delta=2 ➔ RI=2+2), CQI delta: 2 bits (0-3) or 3 bits (0-7) in which CQI=$CQI_1$−CQI delta when multi-TRP is used, and/or PMI2 that is PMI for the second TRP or one combined PMI (e.g., similar to multi-panel type I codebook in 3GPP TS38.214).

According to a third option (option 3), the CSI report may be dynamically selected between option 1 and option 2, for example, according to the combinations of the activated TCI states by MAC-CE. For instance, if at least one codepoint includes single TCI state, then option 2 may be supported. If none of the codepoints include single TCI state, then option 1 may be supported. It is noted that option 2 can be a choice for the network (gNB) to allow scheduling flexibility between single-TRP and multi-TRP operation.

Another aspect relates to approaches for how to indicate a UE's capability to receive multiple TCI states simultaneously. When a UE is equipped with one or more antenna panels, which can adjust the direction of the receiving beam for a given downlink beam, by hybrid beamforming method, the UE may be configured to receive a single beam (TCI state) with each panel. When two TCI states of PDSCH from two TRPs indicated in a TCI codepoint are associated with the same panel, the UE cannot receive two PDSCH from two TRPs simultaneously. Because the network may not know a UE's capability to receive two TCI states simultaneously, in order to guarantee the UE's reception of two TCI states, the UE's feedback of assistance information may be necessary.

For example, the UE's feedback may include one or more of the following. In response to the gNB's providing MAC-CE for activating TCI codepoints, the UE may provide which combination of TCI states can be received by the UE. One option is to send a feedback that includes a bitmap where each bit corresponds to an activated codepoint. For instance, when a bit is set to 1, the combination of TCI states for the corresponding TCI codepoint is capable to be received by the UE; while, when a bit is set to 0, the combination of TCI states cannot be received by the UE. The -bitmap can be reported by UL MAC-CE or a part of UCI feedback. For example, in response to receiving the MAC-CE, the UE can confirm the validity of the combinations. Whenever a UE has a need for the update, the UE can send the MAC-CE to update the UE's status of reception capability.

Another option is that a UE can be configured to transmit the bitmap as a part of uplink control feedback. According to the configuration, the information may be transmitted as part of a periodic CSI report or transmitted by gNB's triggering of an aperiodic CSI report.

Another option is, when a UE receives MAC-CE including all activated TCI states, the UE may be configured to send a MAC-CE with the bitmap where the different bits correspond to all possible combinations with activated TCI states. The mapping of the bitmap position may be the same as shown in Table 2. For instance, a UE may set each bit as 1 (capable to receive the combination) or 0 (not capable to receive the combination).

In an embodiment, after receiving a UE's feedback, a gNB may be configured to update the active TCI codepoints according to UE's capability. In this case, it is possible to divide the MAC-CE in FIG. 2 into two parts. The first part is the same as MAC-CE in FIG. 1, and the second part being the remaining part. In this embodiment, the gNB may be configured to first send the first part, and the UE may send the bitmap including the UE's capability of simultaneous reception for activated TCI states. According to the UE's response, the gNB may avoid including any combination not received by the UE in the activated TCI combinations.

Another aspect relates to approaches for how to configure CSI-RS resource and CSI report. In one embodiment, because only one periodic/semi-persistent CSI-RS resource set can be configured, this may be used for the measurement/feedback of the primary TRP. For primary TRP, a UE may be configured with periodic/semi-persistent CSI-RS resource set and CSI-RS report configuration. On the other hand, for the other TRPs, a UE may be configured with aperiodic CSI-RS resource set as well as aperiodic CSI report. An aperiodic CSI-RS resource set may include multiple TCI states corresponding to candidate TRPs, and according to the different combinations of the candidate TRPs (e.g., candidate TRPs activated via MAC-CE), the network may select a different triggering state via CSI request in DCI format 0_1. In this case, though independent CSI feedback can be used, by using option 2 discussed above, a combined CSI feedback can be supported. In this case, for primary TRP, normal CSI report may be performed, while aperiodic CSI report may just include the delta part in option 2 discussed above.

Another embodiment may use multiple CSI feedback as a report configuration. This embodiment may provide an updated CSI framework to allow multiple CSI feedback in a report configuration. This allows a single CSI report configuration to be associated to multiple CSI-RS resources. For example, a UE can be configured with a periodic or semi-persistent CSI-RS resource set with multiple CSI-RS resources corresponding to multiple TRPs, and this is associated with single CSI report. Considering a practical utilization, for each CSI-RS resource, the number of CSI-RS antenna ports can be limited by maximum rank. In this example, the CSI report can include multiple CRIs (CSI-RS Resource Indication) indicating one or more TRPs, and the combined CSI report as provided above. All three options for CSI generation can be applied in this embodiment.

Figure 3A:
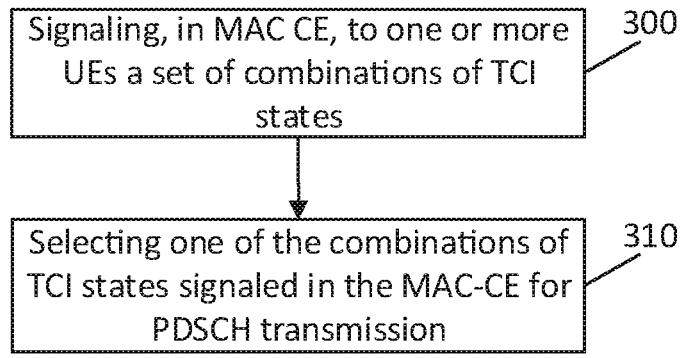
FIG. 3a illustrates an example flow diagram of a method, according to an embodiment.

FIG. 3a illustrates an example flow diagram of a method that may be used to support multi-TRP transmissions, according to one example embodiment. In certain example embodiments, the flow diagram of FIG. 3a may be performed by a network entity or network node in a communication system, such as LTE or 5G NR. For instance, in some example embodiments, the method of FIG. 3a may be performed by a base station, access point, eNB and/or gNB, or other network node.

In an embodiment, the method may include, at 300, signaling or indicating to one or more UEs with a set of combinations of TCI states in a MAC-CE. For example, the signaled combinations of TCI states may be a subset of all TCI states configured by RRC. In an embodiment, the method may then include, at 310, selecting one of the combinations of TCI states signaled in the MAC-CE for PDSCH transmission, e.g., by DCI signaling.

According to one embodiment, in order to indicate the combinations of TCI states, the signaling 300 may include signaling a MAC-CE having an enhanced MAC-CE format that supports the maximum number of TCI states that need to be activated. For example, the MAC-CE may include additional octets for indicating the combination of TCI states for each codepoint. In an embodiment, the additional octets may include NrofCodepoints, NoRpt and/or NoTRS. As introduced above, NrofCodepoints may be used to determine the activated TCI states and number of code points, NoRpt may be used to indicate if CSI report is required for deactivated TCI states, and NoTRS may be used to indicate if TRS associated with deactivated TCI states are transmitted. It is noted that, in certain embodiments, the inclusion of one or more of the NrofCodepoints, NoRpt and/or NoTRS may be optional. For example, in some embodiments, the MAC-CE may not necessarily include the NrofCodepoints.

In certain embodiments, the MAC-CE may also include one or more codepoints mapping, as shown in FIG. 2 discussed above. The codepoints mapping may provide the mapping information of TCI states to TCI codepoints.

In one embodiment, the codepoint mapping may be implemented as a M×P bitmap to map M TCI states to P TCI codepoints, where M represents the TCI states that are activated from the first part of the MAC-CE and P represents the TCI codepoints that are signaled with NrofCodepoints in the MAC-CE. The first P bits may be used for mapping the first TCI state to P TCI codepoints. Each codepoint in the mapping may have one or more bits set to one and, if only one bit sets to one, the codepoint may be considered as indicating single-TRP transmission.

In another embodiment, the codepoint mapping may be implemented such that, for each of P TCI codepoints, 2 TCI state indices are included in order. If two TCI states are the same, in this embodiment, it would mean single TCI state is mapped to the TCI codepoint and single-TRP transmission is used.

In other embodiments, the codepoint mapping may be implemented such that a different size of bitmap is used according to the number of the activated TCI states. In an example embodiment, the bitmap size can be calculated as $$\binom{M+L-1}{L} \text{bits},$$

where L is the maximum number of TCI states to be included in a TCI codepoint.

Figure 3B:
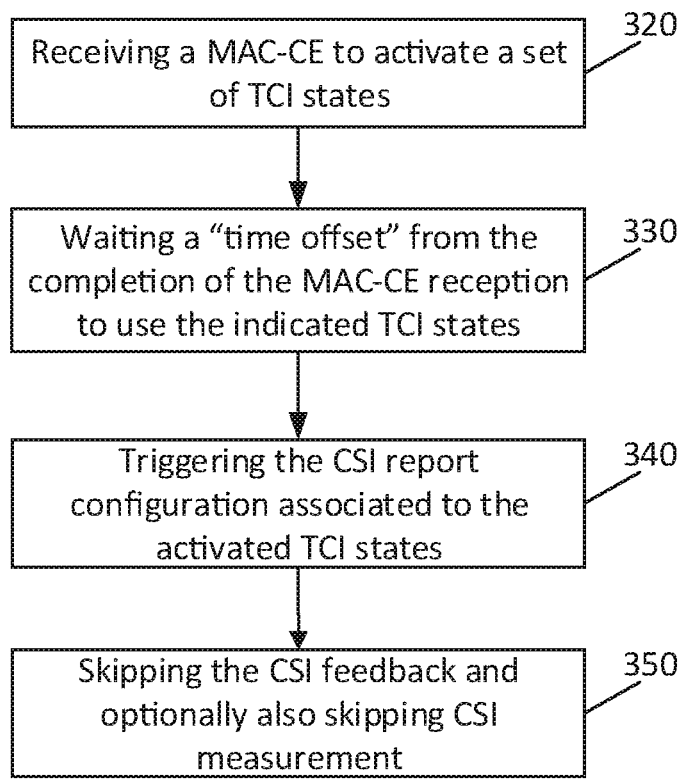
FIG. 3b illustrates an example flow diagram of a method, according to an embodiment.

FIG. 3b illustrates an example flow diagram of a method that reduces UE's overhead due to unnecessary measurements and/or feedback, according to one example embodiment. In certain example embodiments, the flow diagram of FIG. 3b may be performed by a network entity or network node associated with a communications system, such as LTE or 5G NR. For instance, in some example embodiments, the method of FIG. 3b may be performed by a UE or mobile station.

As illustrated in the example of FIG. 3b, the method may include, at 320, receiving a MAC-CE to activate a set of TCI states. The method may then include, at 330, waiting a "time offset" from the completion of the MAC-CE reception to use the indicated TCI states. According to one embodiment, for a CSI report configuration for CSI acquisition, the method may include, at 340, triggering the CSI report configuration associated to the activated TCI states. When a CSI report configuration is associated only with non-activated TCI states, the method may include, at 350, skipping the CSI feedback and optionally also skipping CSI measurement.

In an embodiment, for a CSI report configuration which is configured for L1-RSRP reporting, the method may include performing the CSI measurement and the CSI report. Then, based on reported L1-RSRP report, the network (e.g., gNB) may update the candidate TCI states without receiving other CSI feedback.

According to certain embodiments, the method may include skipping TRS reception when TCI states are deactivated. In some embodiments, for the skipping of CSI feedback or TRS reception, the method may include receiving explicit signaling from the network to skip CSI measurement and/or reporting. For instance, the method may include receiving, from the network (e.g., gNB), an explicit indication to skip CSI measurement and/or feedback, and/or an explicit indication to stop TRS transmission when it is deactivated. In this case, the method may include stopping the reception of the TRS not activated. For TRS, all the CSI-RS resources in a CSI-RS resource set may have the same QCL parameter (TCI state); thus, in an embodiment, the method may include suspending transmission of TRS when the corresponding TCI state is deactivated.

In some embodiments, the receiving of the indication(s) to skip CSI measurement/feedback and/or to stop reception of the TRS not activated may include receiving the indication(s) via MAC-CE. For example, the indication(s) may be received through the MAC-CE that is to be used for TCI activation, or may be received in a new MAC-CE that can be used to indicate the absence of TRS. According to certain embodiments, the indication can be received per TCI state or 1 bit field can indicate an absence of all non-activated TCI states.

Figure 4A:
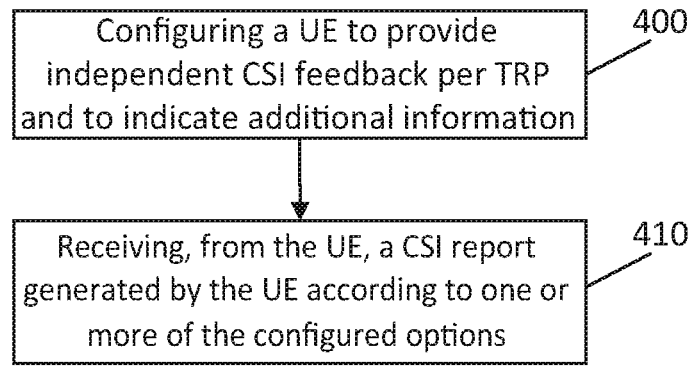
FIG. 4a illustrates an example flow diagram of a method, according to an embodiment.

FIG. 4a illustrates an example flow diagram of a method for efficiently configuring a UE's CSI report and CSI resources, according to one example embodiment. In certain example embodiments, the flow diagram of FIG. 4a may be performed by a network entity or network node in a communication system, such as LTE or 5G NR. For instance, in some example embodiments, the method of FIG. 4a may be performed by a base station, access point, eNB and/or gNB, or other network node.

As illustrated in the example of FIG. 4a, the method may include, at 400, configuring a UE to provide independent CSI feedback per TRP and also to indicate additional information, such as the preferred combination of the cooperating TRPs/TCI states (including single TRP operation) and the combined CQI, RI combinations, etc. In an embodiment, the configuring 400 may include configuring the UE to indicate a predetermined number of preferred combinations of cooperating TRPs/TCI states and the combined CQI, etc., for each preferred combination to enable the network node to make a final, efficient scheduling decision.

According to certain embodiments, in order to generate a combined CSI report, the configuring 400 may include configuring the UE with at least one of several reporting options, as discussed in the following. For instance, in an embodiment, the configuring 400 may include configuring the UE with a first reporting option (option 1), where one combined CSI report may include two best CRI (TCI states), rank combination 3 bits (1, 2, 3, 4, 1+1, 2+1, 1+2, 2+2) mapped in order of TCI states, one combined CQI, and/or PMI. In this example, PMI can be either one of two separate PMIs or one combined PMI.

In an embodiment, the configuring 400 may include configuring the UE with a second reporting option (option 2), where the CSI report may include one CSI for single-TRP and additional parameters including delta or difference-value parameter(s). Under this second reporting option, the CSI for single-TRP operation (corresponding to the best TRP or the primary TRP) may include $CRI_1$, $RI_1=\{1,2,3,4\}$, $CQI_1$ (assuming single TRP is used), and/or $PMI_1$ (when assuming the single TRP transmission). The delta parameters for multi-TRP may include $CRI_2$, delta RSRP (i.e., RSRP deference between two CSI-RS resources, which can be skipped if additional beam management is already providing the difference of RSRP of two TRPs), RI delta (2 bit)=0, 1 or 2 (if RI delta=0, single TRP operation, and no further information is included) in which RI=$RI_1$+RI delta (e.g., if $RI_1$=2, RI delta=1 ➔ RI=2+1 or if $RI_1$=3, RI delta=2 ➔ RI=2+2), CQI delta: 2 bits (0-3) or 3 bits (0-7) in which CQI=$CQI_1$–CQI delta when multi-TRP is used, and/or $PMI_2$ that is PMI for the second TRP or one combined PMI.

In an embodiment, the configuring 400 may include configuring the UE with a third reporting option (option 3), where the CSI report may be dynamically selected between option 1 and option 2, for example, according to the TCI codepoints indicated. For instance, if at least one codepoint includes single TCI state, then option 2 may be dynamically selected. If none of the codepoints include single TCI state, then option 1 may be dynamically selected.

As further illustrated in the example of FIG. 4a, the method may also include, at 410, receiving, from the UE, a CSI report generated by the UE according to one or more of the configured options discussed above.

Another aspect relates to a method for configuring CSI-RS resource and CSI report. In one embodiment, the method may include using the one configured periodic or semi-persistent CSI-RS resource set for the measurement and/or feedback of the primary TRP. Thus, for primary TRP, the method may include configuring the UE with periodic/semi-persistent CSI-RS resource set and CSI-RS report configuration. On the other hand, for the other TRPs, the method may include configuring the UE with aperiodic CSI-RS resource set as well as aperiodic CSI report. An aperiodic CSI-RS resource set may include multiple TCI states corresponding to candidate TRPs, and according to the different combinations of the candidate TRPs (e.g., candidate TRPs activated via MAC-CE), the method may include selecting, by the network, a different triggering state via CSI request in DCI format 0_1. In this case, though independent CSI feedback can be used, a combined CSI feedback can be supported according to the second reporting option (option 2) discussed above. In this case, for primary TRP, normal CSI report may be performed, while aperiodic CSI report may just include the delta part in option 2 discussed above.

Another embodiment may include using multiple CSI feedback as a reporting configuration according to an updated CSI framework that allows multiple CSI feedback in a report configuration. This allows a single CSI report configuration to be associated to multiple CSI-RS resources. For example, the method may include configuring a UE with periodic or semi-persistent CSI-RS resource set with multiple CSI-RS resources corresponding to multiple TRPs, and this is associated with single CSI report.

Figure 4B:
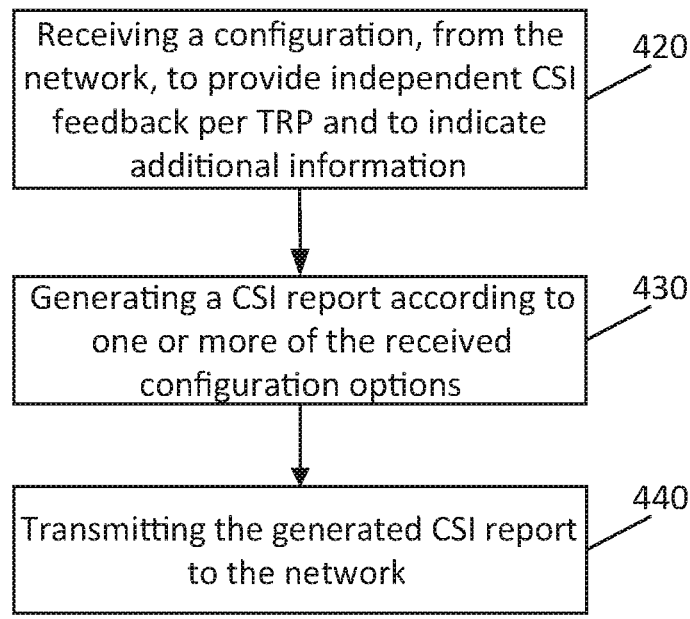
FIG. 4b illustrates an example flow diagram of a method, according to an embodiment.

FIG. 4b illustrates an example flow diagram of a method for CSI-RS resource and/or CSI report generation, according to one example embodiment. In certain example embodiments, the flow diagram of FIG. 4b may be performed by a network entity or network node associated with a communications system, such as LTE or 5G NR. For instance, in some example embodiments, the method of FIG. 4b may be performed by a UE or mobile station.

As illustrated in the example of FIG. 4b, the method may include, at 420, receiving a configuration, from the network, to provide independent CSI feedback per TRP and also to indicate additional information, such as the preferred combination of the cooperating TRPs/TCI states (including single TRP operation) and the combined CQI, RI combinations, etc. In an embodiment, the receiving 420 may include receiving configuration to indicate a predetermined number of preferred combinations of cooperating TRPs/TCI states and the combined CQI, etc., for each preferred combination to enable the network node to make a final, efficient scheduling decision.

According to certain embodiments, in order to generate a combined CSI report, the receiving 420 may include receiving a configuration including at least one of several reporting options. For instance, in an embodiment, the receiving 420 may include receiving a configuration for a first reporting option (option 1), where one combined CSI report may include two best CRI (TCI states), rank combination 3 bits (1, 2, 3, 4, 1+1, 2+1, 1+2, 2+2) mapped in order of TCI states, one combined CQI, and/or PMI. In this example, PMI can be either one of two separate PMIs or one combined PMI.

In an embodiment, the receiving 420 may include receiving a configuration for a second reporting option (option 2), where the CSI report may include one CSI for single-TRP and additional parameters including delta or difference-value parameter(s). Under this second reporting option, the CSI for single-TRP operation (corresponding to the best TRP or the primary TRP) may include $CRI_1$, $RI_1=\{1,2,3,4\}$, $CQI_1$ (assuming single TRP is used), and/or $PMI_1$ (when assuming the single TRP transmission). The delta parameters for multi-TRP may include $CRI_2$, delta RSRP (i.e., RSRP deference between two CSI-RS resources, which can be skipped if additional beam management is already providing the difference of RSRP of two TRPs), RI delta (2 bit)=0, 1 or 2 (if RI delta=0, single TRP operation, and no further information is included) in which $RI=RI_1+RI$ delta (e.g., if $RI_1=2$, RI delta=1 ➔ RI=2+1 or if $RI_1=3$, RI delta=2 ➔ RI=2+2), CQI delta: 2 bits (0-3) or 3 bits (0-7) in which $CQI=CQI_1$–CQI delta when multi-TRP is used, and/or $PMI_2$ that is PMI for the second TRP or one combined PMI.

In an embodiment, the receiving 420 may include receiving a configuration for a third reporting option (option 3), where the CSI report may be dynamically selected between option 1 and option 2, for example, according to the TCI codepoints indicated. For instance, if at least one codepoint includes single TCI state, then option 2 may be dynamically selected. If none of the codepoints include single TCI state, then option 1 may be dynamically selected.

As further illustrated in the example of FIG. 4b, the method may also include, at 430, generating a CSI report according to one or more of the received configuration options discussed above. The method may then include, at 440, transmitting the generated CSI report to the network.

Figure 5A:
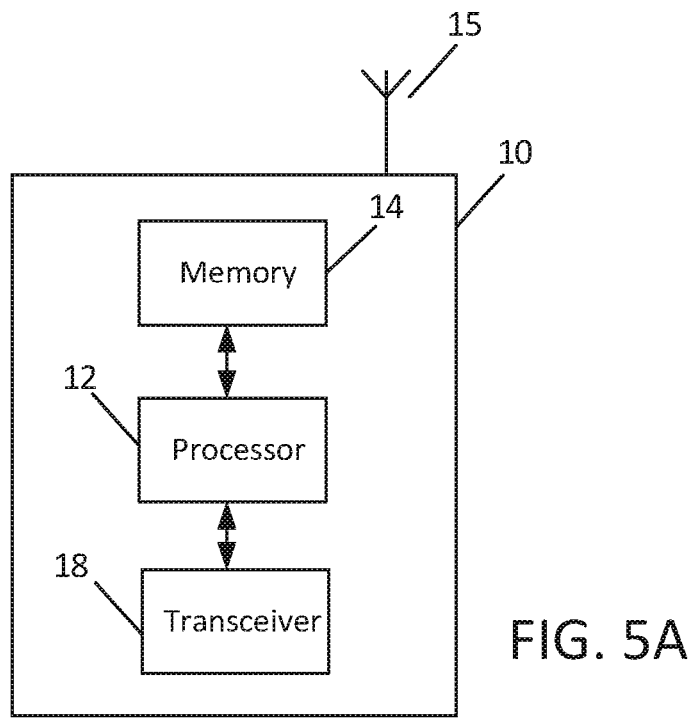
FIG. 5a illustrates an example block diagram of an apparatus, according to an embodiment.

FIG. 5a illustrates an example of an apparatus 10 according to an embodiment. In an embodiment, apparatus 10 may be a node, host, or server in a communications network or serving such a network. For example, apparatus 10 may be a satellite, base station, a Node B, an evolved Node B (eNB), 5G Node B or access point, next generation Node B (NG-NB or gNB), and/or WLAN access point, associated with a radio access network, such as a LTE network, 5G or NR. In example embodiments, apparatus 10 may be an eNB in LTE or gNB in 5G.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5a.

As illustrated in the example of FIG. 5a, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5a, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other embodiments, transceiver 18 may be capable of transmitting and receiving signals or data directly. Additionally or alternatively, in some embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiver circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the example embodiments described herein, such as the flow or signaling diagrams illustrated in FIG. 3a, 3b, 4a, or 4b. In some embodiments, apparatus 10 may be configured to perform procedures for supporting multi-TRP transmissions, for reducing UE's overhead due to unnecessary measurements or feedback, and/or for efficiently configuring UE's CSI report and CSI resources, for example. In an embodiment, apparatus 10 may represent a network node, such as a gNB.

In an embodiment, apparatus 10 may be controlled by memory 14 and processor 12 to signal or indicate to one or more UEs with a set of combinations of TCI states in a MAC-CE. For example, the signaled combinations of TCI states may be a subset of all TCI states configured by RRC. In an embodiment, apparatus 10 may be controlled by memory 14 and processor 12 to select one of the combinations of TCI states signaled in the MAC-CE for PDSCH transmission, e.g., by DCI signaling.

According to one embodiment, in order to indicate the combinations of TCI states, apparatus 10 may be controlled by memory 14 and processor 12 to signal, to the UE(s), a MAC-CE having an enhanced MAC-CE format that supports the maximum number of TCI states that need to be activated. For example, the MAC-CE signaled by apparatus 10 may include additional octets for indicating the combination of TCI states for each codepoint. In an embodiment, the additional octets may include NrofCodepoints, NoRpt and/or NoTRS. As mentioned above, in certain embodiments, the inclusion of one or more of the NrofCodepoints, NoRpt and/or NoTRS may be optional.

In certain embodiments, the MAC-CE signaled by apparatus 10 may also include one or more codepoints mapping, as shown in FIG. 2 discussed above. The codepoints mapping may provide the mapping information of TCI states to TCI codepoints.

In one embodiment, the codepoint mapping may be implemented as a M×P bitmap to map M TCI states to P TCI codepoints, where M represents the TCI states that are activated from the first part of the MAC-CE and P represents the TCI codepoints that are signaled with NrofCodepoints in the MAC-CE. The first P bits may be used for mapping the first TCI state to P TCI codepoints. Each codepoint in the mapping may have one or two bits set to one and, if only one bit sets to one, the codepoint may be considered as indicating single-TRP transmission.

In another embodiment, the codepoint mapping may be implemented such that, for each of P TCI codepoints, 2 TCI state indices are included in order. If two TCI states are the same, in this embodiment, it would mean single TCI state is mapped to the TCI codepoint and single-TRP transmission is used.

In other embodiments, the codepoint mapping may be implemented such that a different size of bitmap is used according to the number of the activated TCI states. In an example embodiment, the bitmap size can be calculated as $$\binom{M+L-1}{L} \text{bits},$$

where L is the maximum number of TCI states to be included in a TCI codepoint.

In certain embodiments, apparatus 10 may be controlled by memory 14 and processor 12 to configure UE(s) to provide independent CSI feedback per TRP and to indicate additional information, such as the preferred combination of the cooperating TRPs/TCI states (including single TRP operation) and the combined CQI, RI combinations, etc. In an embodiment, apparatus 10 may be controlled by memory 14 and processor 12 to configure the UE(s) to indicate a predetermined number of preferred combinations of cooperating TRPs/TCI states and the combined CQI, etc., for each preferred combination to enable the network node to make a final, efficient scheduling decision.

According to certain embodiments, in order to generate a combined CSI report, apparatus 10 may be controlled by memory 14 and processor 12 to configure the UE(s) with at least one of several reporting options, as discussed in the following. For instance, in an embodiment, apparatus 10 may be controlled by memory 14 and processor 12 to configure the UE(s) with a first reporting option (option 1), where one combined CSI report may include two best CRI (TCI states), rank combination 3 bits (1, 2, 3, 4, 1+1, 2+1, 1+2, 2+2) mapped in order of TCI states, one combined CQI, and/or PMI. In this example, PMI can be either one of two separate PMIs or one combined PMI.

In an embodiment, apparatus 10 may be controlled by memory 14 and processor 12 to configure the UE(s) with a second reporting option (option 2), where the CSI report may include one CSI for single-TRP and additional parameters including delta or difference value parameter(s). Under this second reporting option, the CSI for single-TRP operation (corresponding to the best TRP or the primary TRP) may include $CRI_1$, $RI_1=\{1,2,3,4\}$, $CQI_1$ (assuming single TRP is used), and/or $PMI_1$ (when assuming the single TRP transmission).

In an embodiment, apparatus 10 may be controlled by memory 14 and processor 12 to configure the UE(s) with a third reporting option (option 3), where the CSI report may be dynamically selected between option 1 and option 2, for example, according to the TCI codepoints indicated. For instance, if at least one codepoint includes single TCI state, then option 2 may be dynamically selected. If none of the codepoints include single TCI state, then option 1 may be dynamically selected.

According to one embodiment, apparatus 10 may be controlled by memory 14 and processor 12 to receive, from the UE(s), a CSI report generated by the UE(s) according to one or more of the configured options discussed above.

In an embodiment, for primary TRP, apparatus 10 may be controlled by memory 14 and processor 12 to configure the UE(s) with periodic/semi-persistent CSI-RS resource set and CSI-RS report configuration. For the other TRPs, apparatus 10 may be controlled by memory 14 and processor 12 to configure the UE(s) with aperiodic CSI-RS resource set as well as aperiodic CSI report. An aperiodic CSI-RS resource set may include multiple TCI states corresponding to candidate TRPs, and according to the different combinations of the candidate TRPs, apparatus 10 may be controlled by memory 14 and processor 12 to select a different triggering state via CSI request in DCI format 0_1. In another embodiment, apparatus 10 may be controlled by memory 14 and processor 12 to configure the UE(s) with periodic or semi-persistent CSI-RS resource set with multiple CSI-RS resources corresponding to multiple TRPs, and this is associated with single CSI report.

Figure 5B:
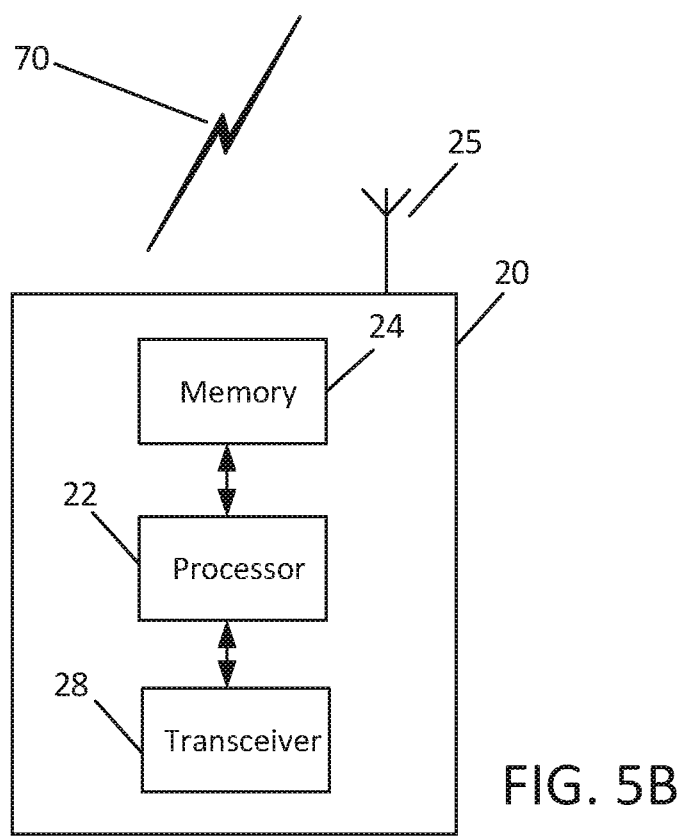
FIG. 5b illustrates an example block diagram of an apparatus, according to an embodiment.

FIG. 5b illustrates an example of an apparatus 20 according to another embodiment. In an embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device, sensor or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink For instance, transceiver 28 may be configured to modulate information on to a carrier waveform for transmission by the antenna(s) 25 and demodulate information received via the antenna(s) 25 for further processing by other elements of apparatus 20. In other embodiments, transceiver 28 may be capable of transmitting and receiving signals or data directly. Additionally or alternatively, in some embodiments, apparatus 20 may include an input and/or output device (I/O device). In certain embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in any of the flow charts or signaling diagrams described herein, such as those illustrated in FIG. 3a, 3b, 4a, or 4b. In certain embodiments, apparatus 20 may include or represent a UE.

In certain embodiments, apparatus 20 may be controlled by memory 24 and processor 22 to receive a MAC-CE to activate a set of TCI states. Apparatus 20 may then be controlled by memory 24 and processor 22 to wait a certain time offset from the completion of the MAC-CE reception to use the indicated TCI states. According to one embodiment, for a CSI report configuration for CSI acquisition, apparatus 20 may be controlled by memory 24 and processor 22 to trigger the CSI report configuration associated to the activated TCI states. When a CSI report configuration is associated only with non-activated TCI states, apparatus 20 may be controlled by memory 24 and processor 22 to skip the CSI feedback and optionally also skip CSI measurement.

In an embodiment, for a CSI report configuration which is configured for L1-RSRP reporting, apparatus 20 may be controlled by memory 24 and processor 22 to perform the CSI measurement and the CSI report. Then, based on reported L1-RSRP report, the network (e.g., gNB) may update the candidate TCI states without receiving other CSI feedback.

According to certain embodiments, apparatus 20 may be controlled by memory 24 and processor 22 to skip TRS reception when TCI states are deactivated. In some embodiments, to initiate the skipping of CSI feedback or TRS reception, apparatus 20 may be controlled by memory 24 and processor 22 to receive explicit signaling from the network to skip CSI measurement and/or reporting. For instance, apparatus 20 may be controlled by memory 24 and processor 22 to receive, from the network (e.g., gNB), an explicit indication to skip CSI measurement and/or feedback, and/or an explicit indication to stop TRS transmission when it is deactivated. In this case, apparatus 20 may be controlled by memory 24 and processor 22 to stop the reception of the TRS not activated. For TRS, all the CSI-RS resources in a CSI-RS resource set may have the same QCL parameter (TCI state); thus, in an embodiment, apparatus 20 may be controlled by memory 24 and processor 22 to suspend transmission of TRS when the corresponding TCI state is deactivated.

In some embodiments, apparatus 20 may be controlled by memory 24 and processor 22 to receive the indication(s) to skip CSI measurement/feedback and/or to stop reception of the TRS not activated via MAC-CE. For example, apparatus 20 may be controlled by memory 24 and processor 22 to receive the indication(s) through the MAC-CE that is to be used for TCI activation, or to receive the indication(s) in a new MAC-CE that can be used to indicate the absence of TRS. According to certain embodiments, apparatus 20 may be controlled by memory 24 and processor 22 to receive the indication(s) per TCI state or 1 bit field can indicate an absence of all non-activated TCI states.

In an embodiment, apparatus 20 may be controlled by memory 24 and processor 22 to receive a configuration, from the network, to provide independent CSI feedback per TRP and to indicate additional information, such as the preferred combination of the cooperating TRPs/TCI states (including single TRP operation) and the combined CQI, RI combinations, etc. In an embodiment, apparatus 20 may be controlled by memory 24 and processor 22 to receive a configuration to indicate a predetermined number of preferred combinations of cooperating TRPs/TCI states and the combined CQI, etc., for each preferred combination to enable the network node to make a final, efficient scheduling decision.

According to certain embodiments, in order to generate a combined CSI report, apparatus 20 may be controlled by memory 24 and processor 22 to receive a configuration including at least one of several reporting options. For instance, in an embodiment, apparatus 20 may be controlled by memory 24 and processor 22 to receive a configuration for a first reporting option (option 1), where one combined CSI report may include two best CRI (TCI states), rank combination 3 bits (1, 2, 3, 4, 1+1, 2+1, 1+2, 2+2) mapped in order of TCI states, one combined CQI, and/or PMI. In this example, PMI can be either one of two separate PMIs or one combined PMI.

In an embodiment, apparatus 20 may be controlled by memory 24 and processor 22 to receive a configuration for a second reporting option (option 2), where the CSI report may include one CSI for single-TRP and additional parameters including delta or difference-value parameter(s). Under this second reporting option, the CSI for single-TRP operation (corresponding to the best TRP or the primary TRP) may include $CRI_1$, $RI_1 = \{1,2,3,4\}$, $CQI_1$ (assuming single TRP is used), and/or $PMI_1$ (when assuming the single TRP transmission).

In an embodiment, apparatus 20 may be controlled by memory 24 and processor 22 to receive a configuration for a third reporting option (option 3), where the CSI report may be dynamically selected between option 1 and option 2, for example, according to the TCI codepoints indicated. For instance, if at least one codepoint includes single TCI state, then apparatus 20 may be controlled by memory 24 and processor 22 to dynamically select option 2. If none of the codepoints include single TCI state, then apparatus 20 may be controlled by memory 24 and processor 22 to dynamically select option 1.

According to an embodiment, apparatus 20 may be controlled by memory 24 and processor 22 to generate a CSI report according to one or more of the received configuration options discussed above. In one embodiment, apparatus 20 may be controlled by memory 24 and processor 22 to transmit the generated CSI report to the network.

Therefore, certain example embodiments provide several technological improvements, enhancements, and/or advantages over existing technological processes and constitute an improvement at least to the technological field of wireless network control and management. For example, according to certain embodiments, if the independent CSI feedback is applied for a UE, in order to support NC-JT, a UE may be configured with multiple CSI-RS resources having different TCI states, where a TCI state can be made to correspond to certain TRP. The CSI-RS resources can be used for TRS and CSI acquisition. A CSI-RS resource set can include one or more CSI-RS resources, and it can be periodic/semi-persistent or aperiodic. If it is configured with a periodic CSI-RS resource set, a UE may be monitored to measure CSI. However, according to example embodiments, though there may be many CSI-RS and CSI report configured, not all the CSI needs to be reported. In case of MAC-CE-based activation, only CSI-RS having activated TCI states would need to be reported. Thus, if the UE's operation is limited with the implicit association between MAC-CE based TCI states vs. CSI report configuration, the UE's complexity from the unnecessary feedback can be reduced. Further, example embodiments provide efficient methods for how to configure CSI resources to support multi-TRP operation. Also, the provided feedback method to generate the combined CSI (especially for option 2 and option 3) improve the scheduling flexibility in a gNB when determining the scheduling of either single TRP or multi-TRP transmission. Accordingly, the use of certain example embodiments results in improved functioning of communications networks and their nodes, such as base stations, eNBs, gNBs, TRPs, and/or UEs or mobile stations.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and may include program instructions to perform particular tasks.

A computer program product may include one or more computer-executable components which, when the program is run, are configured to carry out some example embodiments. The one or more computer-executable components may be at least one software code or portions of code. Modifications and configurations required for implementing functionality of an example embodiment may be performed as routine(s), which may be implemented as added or updated software routine(s). In one example, software routine(s) may be downloaded into the apparatus.

As an example, software or computer program code or portions of code may be in source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and/or software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, such as a non-tangible means, that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, which may include at least a memory for providing storage capacity used for arithmetic operation(s) and/or an operation processor for executing the arithmetic operation(s).

One having ordinary skill in the art will readily understand that the example embodiments as discussed above may be practiced with procedures in a different order, and/or with hardware elements in configurations which are different than those which are disclosed. Therefore, although some embodiments have been described based upon these example embodiments, it would be apparent to those of skill in the art that certain modifications, variations, and alternative constructions would be apparent, while remaining within the spirit and scope of example embodiments.

A first embodiment may be directed to a method that includes signaling or indicating, by a network node, to one or more UEs a set of combinations of TCI states in a MAC-CE. The method may then include selecting one of the combinations of TCI states signaled in the MAC-CE for PDSCH transmission, for example, by DCI signaling.

In a variant, the signaled combinations of TCI states may be a subset of all TCI states configured by RRC.

According a variant, the signaling may include signaling the MAC-CE having an enhanced MAC-CE format that supports the maximum number of TCI states that need to be activated. For example, in a variant, the MAC-CE may include additional octets for indicating the combination of TCI states for each codepoint.

In a variant, the additional octets may include at least one of: NrofCodepoints, NoRpt, and/or NoTRS, where the NrofCodepoints represents the number of codepoints and may be used to determine the activated TCI states, NoRpt indicates if CSI report is required for deactivated TCI states, and NoTRS indicates if TRS associated with deactivated TCI states are transmitted.

In a variant, the MAC-CE may also include one or more codepoints mapping that may provide the mapping information of TCI states to TCI codepoints.

In a variant, the codepoint mapping may be implemented as a M×P bitmap to map M TCI states to P TCI codepoints, where M represents the TCI states that are activated from the first part of the MAC-CE and P represents the TCI codepoints that are signaled with NrofCodepoints in the MAC-CE.

In another variant, the codepoint mapping may be implemented such that, for each of P TCI codepoints, 2 TCI state indices are included in order.

In another variant, the codepoint mapping may be implemented such that a different size of bitmap is used according to the number of the activated TCI states, where the bitmap size can be calculated as $$\binom{M+L-1}{L} \text{bits},$$

where L is the maximum number of TCI states to be included in a TCI codepoint.

A second embodiment may be directed to a method that includes configuring a UE, by a network node, to provide independent CSI feedback per TRP and to indicate additional information. The configuring may include configuring the UE with at least one of several reporting options for generating a combined CSI report.

In a variant, the additional information may include a preferred combination of the cooperating TRPs/TCI states (including single TRP operation) and the combined CQI, RI combinations, etc. In a variant, the configuring may include configuring the UE to indicate a predetermined number of preferred combinations of cooperating TRPs/TCI states and the combined CQI, etc., for each preferred combination to enable the network node to make a final, efficient scheduling decision.

In a variant, the configuring may include configuring the UE with a first reporting option, where one combined CSI report may include at least one of: the two best CRI (TCI states), rank combination 3 bits (1, 2, 3, 4, 1+1, 2+1, 1+2, 2+2) mapped in order of TCI states, one combined CQI, and/or PMI.

In another variant, the configuring may include configuring the UE with a second reporting option, where the CSI report may include one CSI for single-TRP and additional parameters which may include delta or difference-value parameter(s). According to the second reporting option, the CSI for single-TRP operation (corresponding to the best TRP or the primary TRP) may include $CRI_1$, $RI_1=\{1,2,3,4\}$, $CQI_1$ (assuming single TRP is used), and/or $PMI_1$ (when assuming the single TRP transmission). In a variant, the delta parameters for multi-TRP may include at least one of: $CRI_2$, delta RSRP, RI delta in which $RI=RI_1+RI$ delta, CQI delta in which $CQI=CQI_1-CQI$ delta when multi-TRP is used, and/or $PMI_2$ that is PMI for the second TRP or one combined PMI.

In a variant, the configuring may include configuring the UE with a third reporting option, where the CSI report may be dynamically selected between the first reporting option and the second reporting option, for example, according to the TCI codepoints indicated. For instance, according to a variant, if at least one codepoint includes single TCI state, then option 2 may be dynamically selected. According to a variant, if none of the codepoints include single TCI state, then option 1 may be dynamically selected.

According to a further variant, the method may also include receiving, from the UE, a CSI report generated by the UE according to one or more of the configured reporting options.

A third embodiment may be directed to a method that includes receiving, by a UE, a MAC-CE to activate a set of TCI states. The method may also include waiting a certain time offset from the completion of the MAC-CE reception to use the indicated TCI states.

According to a variant, for a CSI report configuration for CSI acquisition, the method may include triggering the CSI report configuration associated to the activated TCI states. In a variant, when a CSI report configuration is associated only with non-activated TCI states, the method may include skipping the CSI feedback and optionally also skipping CSI measurement.

In a variant, for a CSI report configuration which is configured for L1-RSRP reporting, the method may include performing the CSI measurement and the CSI reporting.

In a variant, the method may include skipping TRS reception when TCI states are deactivated. In some variants, to trigger the skipping of CSI feedback or TRS reception, the method may include receiving explicit signaling from the network indicating to skip CSI measurement and/or reporting. For instance, in a variant, the method may include receiving, from the network (e.g., gNB), an explicit indication to skip CSI measurement and/or feedback, and/or an explicit indication to stop TRS when it is deactivated. In a variant, the method may include stopping the reception of the TRS not activated. In a variant, the method may include suspending transmission of TRS when the corresponding TCI state is deactivated.

In some variants, the receiving of the indication(s) to skip CSI measurement/feedback and/or to stop reception of the TRS not activated may include receiving the indication(s) via MAC-CE. For example, in some variants, the indication(s) may be received through the MAC-CE that is to be used for TCI activation, or may be received in a new MAC-CE that can be used to indicate the absence of TRS. According to a variant, the indication can be received per TCI state or 1 bit field can indicate an absence of all non-activated TCI states.

A fourth embodiment may be directed to a method that includes receiving, by a UE, a configuration, from the network, to provide independent CSI feedback per TRP and to indicate additional information. The receiving of the configuration may include receiving a configuration for at least one of several reporting options for generating a combined CSI report.

In a variant, the additional information may include a preferred combination of the cooperating TRPs/TCI states (including single TRP operation) and the combined CQI, RI combinations, etc. In a variant, the receiving may include receiving a configuration for the UE to indicate a predetermined number of preferred combinations of cooperating TRPs/TCI states and the combined CQI, etc., for each preferred combination to enable the network node to make a final, efficient scheduling decision.

In a variant, the receiving may include receiving a configuration for a first reporting option, where one combined CSI report may include at least one of: the two best CRI (TCI states), rank combination 3 bits (1, 2, 3, 4, 1+1, 2+1, 1+2, 2+2) mapped in order of TCI states, one combined CQI, and/or PMI.

In another variant, the receiving may include receiving a configuration for a second reporting option, where the CSI report may include one CSI for single-TRP and additional parameters which may include delta or difference-value parameter(s). According to the second reporting option, the CSI for single-TRP operation may include $CRI_1$, $RI_1=\{1,2,3,4\}$, $CQI_1$, and/or $PMI_1$. In a variant, the delta parameters for multi-TRP may include at least one of: $CRI_2$, delta RSRP, RI delta in which $RI=RI_1+RI$ delta, CQI delta in which $CQI=CQI_1-CQI$ delta when multi-TRP is used, and/or $PMI_2$ that is PMI for the second TRP or one combined PMI.

In a variant, the receiving may include receiving a configuration for a third reporting option, where the CSI report may be dynamically selected between the first reporting option and the second reporting option, for example, according to the TCI codepoints indicated. For instance, according to a variant, if at least one codepoint includes single TCI state, then the method may include dynamically selecting option 2 for CSI reporting. According to a variant, if none of the codepoints include single TCI state, then the method may include dynamically selecting option 1 for CSI reporting.

In a variant, the method may include generating a CSI report according to one or more of the received configuration options discussed above. In a variant, the method may then include transmitting the generated CSI report to the network.

A fifth embodiment is directed to an apparatus including at least one processor and at least one memory comprising computer program code. The at least one memory and computer program code may be configured, with the at least one processor, to cause the apparatus at least to perform the method according to the first embodiment, second embodiment, third embodiment, fourth embodiment, or any of the variants described above.

A sixth embodiment is directed to an apparatus that may include circuitry configured to perform the method according to the first embodiment, second embodiment, third embodiment, fourth embodiment, or any of the variants described above.

A seventh embodiment is directed to an apparatus that may include means for performing the method according to the first embodiment, second embodiment, third embodiment, fourth embodiment, or any of the variants described above.

An eighth embodiment is directed to a non-transitory computer readable medium comprising program instructions stored thereon for performing at least the method according to the first embodiment, second embodiment, third embodiment, fourth embodiment, or any of the variants described above.

We claim:

1. An apparatus, comprising:
   at least one processor; and
   at least one memory comprising computer program code, the at least one memory and computer program code configured, with the at least one processor, to cause the apparatus at least to:
   receive a configuration, from a network node, to provide independent channel state information, CSI, feedback per transmission reception point, TRP,
   wherein the configuration comprises a configuration for at least one of a plurality of reporting options for generating a combined CSI report,
   wherein the reporting options comprise a first reporting option in which one combined CSI report comprises at least one of: two best CSI-reference signal, RS, resource indicators, CRIs, rank combination bits mapped in the order of TCI states, one combined CQI, or a precoding matrix indicator, PMI,
   wherein the reporting options comprise a second reporting option in which the combined CSI report comprises one CSI for single TRP and additional parameters comprise at least one difference-value parameter, and
   wherein the reporting options comprise a third reporting option in which the CSI report is dynamically selected between the first reporting option and the second reporting option according to at least one indicated TCI codepoint.

2. The apparatus according to claim 1, wherein the configuration further comprises a configuration to the apparatus to provide additional information, wherein the additional information comprises at least one of a preferred combination of cooperating TRPs and transmission configuration indicator, TCI, states, or a combined channel quality indicator, CQI, or rank indicator, RI, combinations.

3. The apparatus according to claim 1, wherein the configuration comprises a configuration to the apparatus to indicate a predetermined number of preferred combinations of cooperating TRPs and TCI states and a combined CQI for each preferred combination to enable the network node to make a scheduling decision.

4. The apparatus according to claim 1, wherein:
when at least one codepoint includes a single TCI state, the second reporting option is dynamically selected; and
when none of the codepoints include a single TCI state, the first reporting option is dynamically selected.

5. The apparatus according to claim 1, wherein the at least one memory and computer program code configured, with the at least one processor, to cause the apparatus at least to:
transmit to the network node a CSI report generated by the apparatus according to one or more of the configured reporting options.

6. An apparatus, comprising:
at least one processor; and
at least one memory comprising computer program code, the at least one memory and computer program code configured, with the at least one processor, to cause the apparatus at least to:
send a configuration to a user equipment, UE, to provide independent channel state information, CSI, feedback per transmission reception point, TRP,
wherein the configuration comprises a configuration for at least one of a plurality of reporting options for generating a combined CSI report,
wherein the reporting options comprise a first reporting option in which one combined CSI report comprises at least one of: two best CSI-reference signal, RS, resource indicators, CRIs, rank combination bits mapped in the order of TCI states, one combined CQI, or a precoding matrix indicator, PMI,
wherein the reporting options comprise a second reporting option in which the combined CSI report comprises one CSI for single TRP and additional parameters comprise at least one difference-value parameter, and
wherein the reporting options comprise a third reporting option in which the CSI report is dynamically selected between the first reporting option and the second reporting option according to at least one indicated TCI codepoint.

7. The apparatus according to claim 6, wherein the configuration further comprises a configuration to the UE to provide additional information, wherein the additional information comprises at least one of a preferred combination of cooperating TRPs and transmission configuration indicator, TCI, states, or a combined channel quality indicator, CQI, or rank indicator, RI, combinations.

8. The apparatus according to claim 6, wherein the configuration comprises a configuration to the UE to indicate a predetermined number of preferred combinations of cooperating TRPs and TCI states and a combined CQI for each preferred combination to enable the apparatus to make a scheduling decision.

9. The apparatus according to claim 6, wherein:
when at least one codepoint includes a single TCI state, the second reporting option is dynamically selected; and
when none of the codepoints include a single TCI state, the first reporting option is dynamically selected.

10. The apparatus according to claim 6, wherein the at least one memory and computer program code configured, with the at least one processor, to cause the apparatus at least to:
receive from the UE a CSI report generated by the UE according to one or more of the configured reporting options.

11. A method, comprising:
receiving, at a user equipment, UE, a configuration, from a network node, to provide independent channel state information, CSI, feedback per transmission reception point, TRP,
wherein the configuration comprises a configuration for at least one of a plurality of reporting options for generating a combined CSI report,
wherein the reporting options comprise a first reporting option in which one combined CSI report comprises at least one of: two best CSI-reference signal, RS, resource indicators, CRIs, rank combination bits mapped in the order of TCI states, one combined CQI, or a precoding matrix indicator, PMI,
wherein the reporting options comprise a second reporting option in which the combined CSI report comprises one CSI for single TRP and additional parameters comprise at least one difference-value parameter, and
wherein the reporting options comprise a third reporting option in which the CSI report is dynamically selected between the first reporting option and the second reporting option according to at least one indicated TCI codepoint.

12. The method according to claim 11, wherein the configuration further comprises a configuration to the UE to provide additional information, wherein the additional information comprises at least one of a preferred combination of cooperating TRPs and transmission configuration indicator, TCI, states, or a combined channel quality indicator, CQI, or rank indicator, RI, combinations.

13. The method according to claim 11, wherein the configuration comprises a configuration to the UE to indicate a predetermined number of preferred combinations of cooperating TRPs and TCI states and a combined CQI for each preferred combination to enable the network node to make a scheduling decision.

14. The method according to claim 11, further comprising:
transmitting to the network node a CSI report generated by the UE according to one or more of the configured reporting options.

* * * * *